US009820228B2

(12) United States Patent
Chuttani et al.

(10) Patent No.: US 9,820,228 B2
(45) Date of Patent: Nov. 14, 2017

(54) APPARATUS, SYSTEM, AND METHOD FOR TOGGLING CARRIER AGGREGATION

(71) Applicant: APPLE INC., Cupertino, CA (US)

(72) Inventors: Harshit Chuttani, Fremont, CA (US); Sai Sravan Bharadwaj Karri, Morgan Hill, CA (US); Someet Lal, Fremont, CA (US); Navid Damji, San Jose, CA (US)

(73) Assignee: APPLE INC., Cupertino, CA (US)

( * ) Notice: Subject to any disclaimer, the term of this patent is extended or adjusted under 35 U.S.C. 154(b) by 3 days.

(21) Appl. No.: 14/853,404

(22) Filed: Sep. 14, 2015

(65) Prior Publication Data

US 2016/0262177 A1    Sep. 8, 2016

Related U.S. Application Data

(60) Provisional application No. 62/129,165, filed on Mar. 6, 2015.

(51) Int. Cl.
*H04W 4/00* (2009.01)
*H04W 52/02* (2009.01)
*H04W 76/02* (2009.01)
*H04L 5/00* (2006.01)

(52) U.S. Cl.
CPC ......... *H04W 52/0225* (2013.01); *H04L 5/001* (2013.01); *H04W 76/025* (2013.01); *H04L 5/0057* (2013.01); *Y02B 60/50* (2013.01)

(58) Field of Classification Search
None
See application file for complete search history.

(56) References Cited

U.S. PATENT DOCUMENTS

| 2012/0281548 | A1* | 11/2012 | Lin | H04W 36/30 370/242 |
| 2013/0070609 | A1* | 3/2013 | Hultell | H04L 5/06 370/241 |
| 2015/0172032 | A1* | 6/2015 | Khay-Ibbat | H04L 5/0057 370/329 |
| 2015/0223087 | A1* | 8/2015 | Yu | H04L 5/001 455/418 |
| 2016/0255577 | A1* | 9/2016 | Kazmi | H04W 52/0206 370/311 |

* cited by examiner

*Primary Examiner* — Anh-Vu Ly
(74) *Attorney, Agent, or Firm* — Fay Kaplun & Marcin, LLP

(57) ABSTRACT

An apparatus, system, and method optimize a manner in which carrier aggregation (CA) is used. The apparatus comprises a transceiver and processor. The transceiver is used to establish a connection with a network including first and second network components used for a CA functionality. The processor implicitly deactivates the SCell while the CA functionality is enabled by the network by determining that the CA functionality is enabled by the network, determining that the SCell is one of out-of-service (OoS) and effectively OoS when the second network component is reachable by the apparatus and a connection parameter with the second network component is below a predetermined threshold, transmitting a channel quality indicator (CQI) value of zero for the SCell to the first network component to implicitly deactivate the SCell, and utilizing a low power consumption state where monitoring of the SCell is terminated.

22 Claims, 7 Drawing Sheets

Table 700

| | 1st State | 2nd State | 3rd State | 4th State |
|---|---|---|---|---|
| | T | 2T | 4T | 8T |

Fig. 7A

Table 750

| | 1st State | 2nd State | 3rd State | 4th State |
|---|---|---|---|---|
| Stationary | 2T | 4T | 8T | 16T |
| Slow | T | 2T | 4T | 8T |
| Fast | T/2 | T | 2T | 4T |

Fig. 7B

APPARATUS, SYSTEM, AND METHOD FOR TOGGLING CARRIER AGGREGATION

PRIORITY CLAIM/INCORPORATION BY REFERENCE

This application claims priority to U.S. Provisional Application 62/129,165 entitled "Apparatus, System, and Method for Toggling Carrier Aggregation," filed on Mar. 6, 2015, the entirety of which is incorporated herein by reference.

BACKGROUND INFORMATION

A user equipment (UE) may be configured to establish a connection with a network. For example, the UE may be a mobile device and utilize a wireless communications protocol. The UE may exchange data with the network directly and/or with other end devices through the network. Specifically, the UE may associate with a network component that serves as a primary serving cell (PCell). The PCell may control the manner in which the data is exchanged with the UE such as determining when uplink and downlink grants are given for the UE. The PCell may also control the mechanism used in exchanging data, particularly how data is transmitted to and received by the UE.

In a specific example, the PCell and the UE may be configured with a carrier aggregation functionality. The carrier aggregation functionality enables the PCell and a further secondary serving cell (SCell) to combine bandwidths to exchange data with the UE. Thus, with carrier aggregation, the PCell may provide a first portion of a total bandwidth for data to be exchanged while the SCell may provide a second portion of the total bandwidth. This carrier aggregation mechanism requires a higher amount of power as further processes are used to achieve this greater rate of transmission. There may be instances where the power usage from carrier aggregation using the SCell outweighs the benefit of the greater rate of transmission.

SUMMARY

In a first exemplary embodiment, the present invention relates to a user equipment, comprising: a transceiver configured to enable the user equipment to establish a connection with a network including a first network component and a second network component and to use a carrier aggregation functionality, the first network component configured as a primary serving cell (PCell) and the second network component configured as a secondary serving cell (SCell); and a processor configured to implicitly deactivate the SCell while the carrier aggregation functionality is enabled by the network by: determining that the carrier aggregation functionality is enabled by the network; determining that the SCell is one of out-of-service (OoS) and effectively OoS, the SCell being effectively OoS when the second network component is reachable by the user equipment and a connection parameter with the second network component is below a predetermined threshold; transmitting a channel quality indicator (CQI) value of zero for the SCell to the first network component to implicitly deactivate the SCell; and utilizing a low power consumption state where monitoring of the SCell is terminated.

In a second exemplary embodiment, the present invention relates to a method, comprising: at a user equipment configured to implicitly deactivate a secondary serving cell (SCell) while the carrier aggregation functionality is enabled by the network, the user equipment establishing a connection with a network including a first network component configured as a primary serving cell (PCell) and a second network component configured as the SCell: determining that the carrier aggregation functionality is enabled by the network; determining an absence of the SCell for a predetermined time duration; performing a search for the SCell upon determining the absence of the SCell; transmitting a channel quality indicator (CQI) value of zero for the SCell to the first network component while performing the search to implicitly deactivate the SCell; and utilizing a low power consumption state where monitoring of the SCell is terminated.

In a third exemplary embodiment, the present invention relates to A method, comprising: at a user equipment configured to implicitly deactivate a secondary serving cell (SCell) while the carrier aggregation functionality is enabled by the network, the user equipment establishing a connection with a network including a first network component configured as a primary serving cell (PCell) and a second network component configured as the SCell: determining that the carrier aggregation functionality is enabled by the network; monitoring at least one connection parameter associated with the SCell; determining whether a criteria threshold for the at least one connection parameter is met; transmitting a channel quality indicator (CQI) value of zero for the SCell to the first network component when the criteria threshold is met for a predetermined time duration; and utilizing a low power consumption state where monitoring of the SCell is deactivated for the predetermined time duration.

BRIEF DESCRIPTION OF THE DRAWINGS

FIG. 7A shows a first exemplary table of time durations, according to some embodiments.

FIG. 7B shows a second exemplary table of time durations, according to some embodiments.

DETAILED DESCRIPTION

Figure 1:
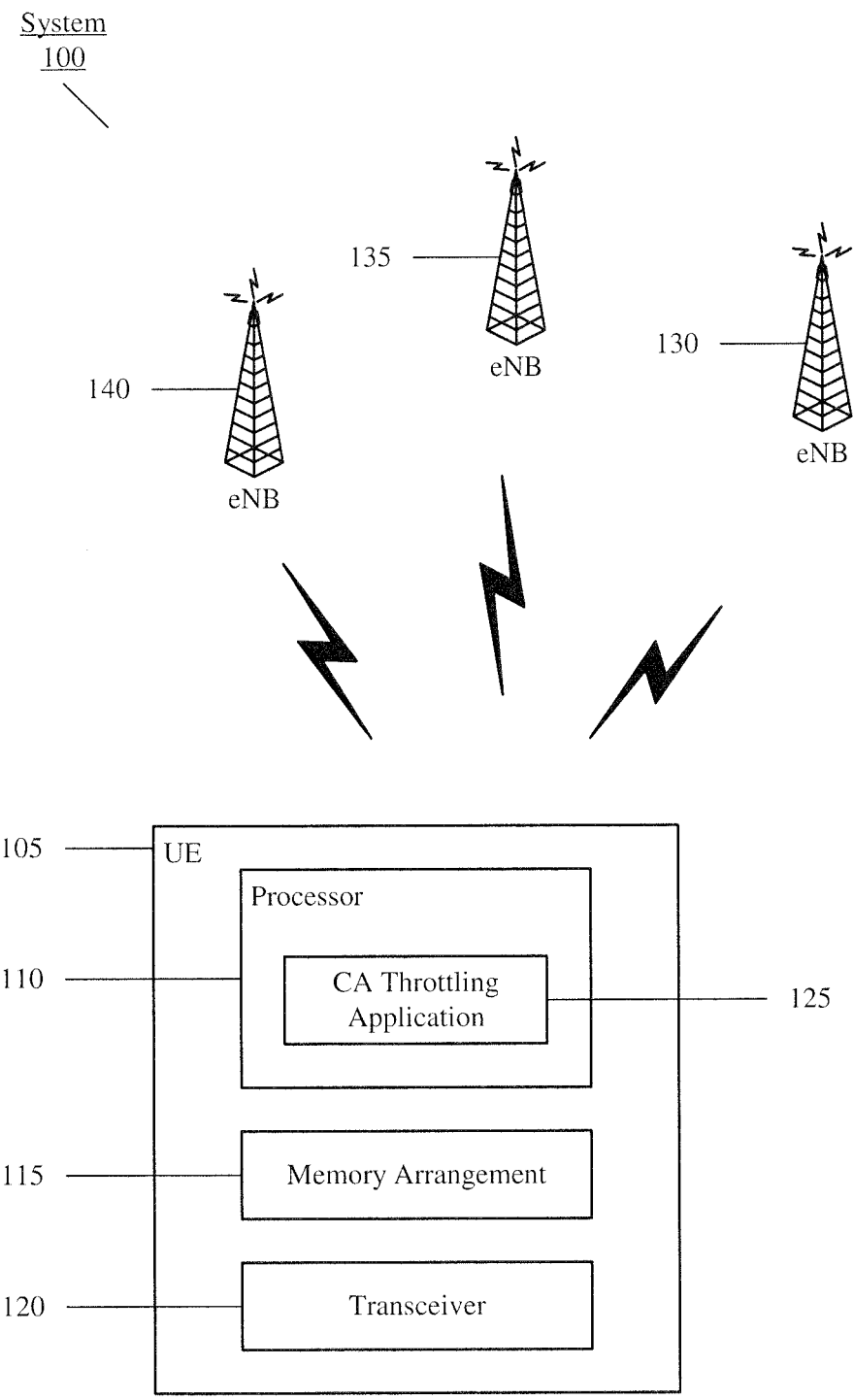
FIG. 1 shows an exemplary system where a user equipment performs a carrier aggregation throttling functionality, according to some embodiments.

The exemplary embodiments may be further understood with reference to the following description and the related appended drawings, wherein like elements are provided with the same reference numerals. The exemplary embodiments are related to an apparatus, system, and method for optimizing a manner in which carrier aggregation (CA) is used. The exemplary embodiments provide a mechanism for a user equipment (UE) that has the CA functionality enabled with a network to implicitly deactivate a component of the CA. Specifically, the CA functionality may include a primary serving cell (PCell) and at least one secondary serving cell (SCell). The exemplary embodiments may enable the UE to implicitly deactivate the SCell that may be out of service (OoS) and/or have degraded performance.

Initially, it should be noted that an implicit deactivation of the CA functionality, particularly with respect to a SCell, relates to a UE operation. That is, the SCell itself does not become deactivated. Accordingly, when viewed from the perspective of the network, the CA functionality may still be in effect and enabled for the UE. However, the UE may implicitly deactivate the SCell by performing operations on its end to act as if the network has indeed deactivated the CA functionality regarding the SCell. For example, while the UE has implemented the implicit deactivation of the SCell, the UE may terminate monitoring the SCC associated with the SCell. Therefore, the implicit deactivation may result in conditions substantially similar to when the UE does not have the CA functionality enabled with respect to the SCell.

When the CA functionality is used, there may be a number of serving cells for each of the component carriers. The coverage of the serving cells may differ due to both component carrier frequencies and power planning, which is useful for heterogeneous network planning. A radio resource control (RRC) connection is handled by one cell, namely the PCell, served by the primary component carrier (PCC) for uplink (UL) and downlink (DL). Specifically, with a Long Term Evolution (LTE) network, the PCell may be an Evolved Node B (eNB) which is a hardware network component connected to a mobile network for communicating directly with UEs in a substantially similar manner as base transceiver stations in a GSM network.

The other component carriers may be referred to as secondary component carriers (SCC) for UL and DL, serving the SCells. The SCCs are added and removed as required, while the PCC is changed at handover. That is, while a connection to the LTE network is established, the UE always has the PCC provided by the eNB to which it has associated while the SCCs may be included or removed as needed. The SCells may also be eNBs. Those skilled in the art will understand that the PCell and SCells are logical constructs allowing for the addition of SCells as needed. The PCell is the main cell that is used for all Radio Resource Control (RRC) signaling and control procedures, while the SCell is considered an augmentation to the PCell.

Those skilled in the art will understand that the CA functionality is controlled by the eNB serving as the PCell for the UE. For example, upon detection that the UE is CA capable and a rate of transmission to the UE is under a maximum possible rate of transmission, the eNB may enable the CA functionality. The SCells may be selected and provide the SCCs for the transmission. However, since the activation and deactivation of the CA functionality is a network function, the UE may not be allowed to select when the CA functionality is used. This may result in unnecessarily high power consumption when the UE is operating in CA mode or a CA enabled state, particularly when the CA functionality provides less benefit compared to the power usage.

According to the exemplary embodiments, the UE 105 may include a CA throttling capability by implicitly deactivating the CA functionality while the network remains in control of whether the CA functionality is enabled or disabled. Specifically, the UE may implicitly deactivate the SCell and reduce power consumption through this implicit deactivation. The mechanism by which the UE may implicitly deactivate the SCell may include transmission of a channel quality indicator (CQI) having a value of zero to the eNB serving as the PCell. The transmission of a CQI of zero for the SCell indicates to the PCell that the SCell is not available to the UE. According to a first exemplary embodiment, the UE may implicitly deactivate the CA functionality for a SCell that is determined to be OoS. According to a second exemplary embodiment, the UE may implicitly deactivate the CA functionality for a SCell that is determined to no longer provide sufficient benefit from its SCC in comparison to the power being consumed through its use. While this second exemplary embodiment is not an OoS condition, it will be described herein as an "effective OoS" condition for the SCell. That is, the SCell is reachable by the UE but the UE determines the benefit of using the SCell does not justify the power being used by the UE.

FIG. 1 shows an exemplary system 100 where a UE performs a CA throttling functionality by implicitly deactivating the CA functionality. The system 100 includes a UE 105 and a plurality of eNBs 130, 135, 140. As discussed above, the UE 105 may associate with one of the eNBs 130-140 such as the eNB 130 to join the network corresponding to the eNB 130 such as a LTE network. The UE 105 and the eNBs 130-140 may also include the CA functionality that may be enabled and controlled by the eNB 130. As the UE 105 is associated with the eNB 130, the eNB 130 may provide the CA configuration for component carriers to be used by the UE 105 in which the eNB 130 may be the PCell and the eNBs 135, 140 may serve as the SCells.

The UE 105 may be any electronic component configured to join a network via the eNB 130. For example, the UE 105 may be a portable device such as a cellular phone, a smartphone, a tablet, a phablet, a laptop, a wearable, etc. In another example, the UE 105 may be a stationary device such as a desktop terminal. However, the UE 105 may include a limited power supply such as a battery. The UE 105 may also operate on a variety of different frequencies or channels (i.e., range of continuous frequencies). Accordingly, the UE 105 may include components that enable different technologies supported thereby. As shown in FIG. 1, the UE 105 may include a processor 110, a memory arrangement 115, and a transceiver 120. However, the UE 105 may also include further components such as a display device, an input/output (I/O) device, and other components such as a portable power supply, an audio I/O device, etc.

The processor 110 may be configured to execute a plurality of applications of the UE 105. For example, the applications may include a web browser when connected to a communication network via the transceiver 120. Accordingly, data may be exchanged with the network. More specifically, the data may be exchanged using the CA functionality to increase a rate in which the data is exchanged. In another example, the applications may include a CA throttling application 125 that is configured to determine when to implicitly deactivate the CA functionality associated with a given SCell. As will be described in further detail below, the CA throttling application 125 may determine when the CA functionality for a particular SCell is utilizing a higher power consumption than warranted based upon the performance of the SCC. It should be noted that the CA throttling application 125 being an application (e.g., a program) executed by the processor 110 is only exemplary. The CA throttling application 125 may also be represented as a separate incorporated component of the UE 105 or may be a modular component coupled to the UE 105.

The memory arrangement 115 may be a hardware component configured to store data related to operations performed by the UE 105. Specifically, the memory arrangement 115 may store a deactivation timer table. As will be described in further detail below, the deactivation timer table may include the timers allotted for a given set of circumstances of the SCell being experienced by the UE 105. That is, the deactivation timer may provide a predetermined set of durations in which the UE 105 is to implicitly deactivate the CA functionality, particularly when the SCell is providing a degraded performance (when compared to power usage). The deactivation timer table will be described in further detail below with regard to FIGS. 7A and 7B.

Figure 2:
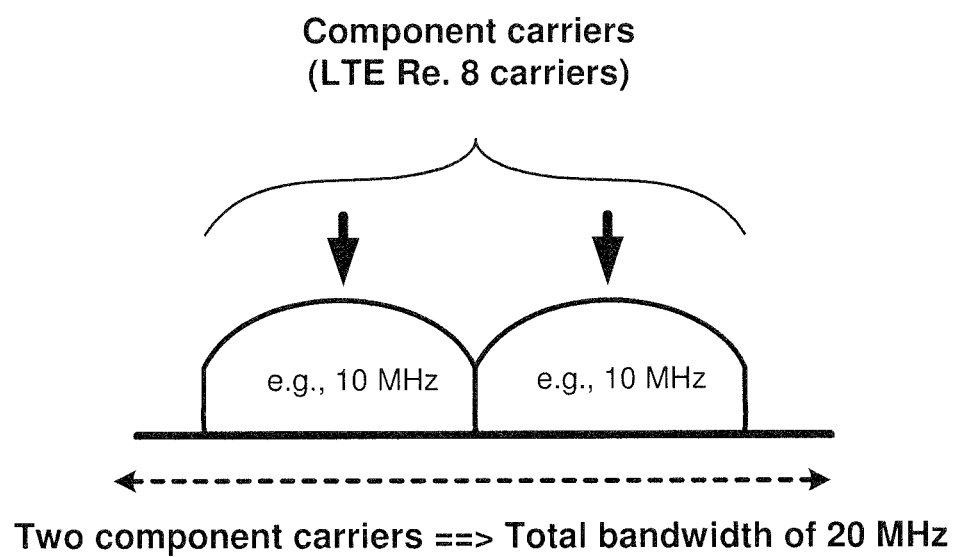
FIG. 2 shows an example of carrier aggregation, according to some embodiments.

Using the CA functionality, the eNB 130 may serve as the PCell while the eNBs 135, 140 may serve as at least one of the SCells. FIG. 2 shows an example of carrier aggregation. As shown in FIG. 2, the PCell may provide a first component carrier of 10 MHz representing the PCC while the SCell may provide a second component carrier of 10 MHz representing the SCC. Also shown in FIG. 2 is one type of carrier aggregation. Specifically, FIG. 2 shows the two component carriers in an intra-band carrier aggregation with continuous component carriers. However, those skilled in the art will understand that other types of carrier aggregation may also be used such as intra-band carrier aggregation with non-continuous component carriers, inter-band carrier aggregation, or any combination of these three types. Furthermore, those skilled in the art will understand that other bandwidths may be used such as 1.4, 3, 5, 15, or 20 MHz and typically a maximum of five component carriers may be aggregated. As illustrated in FIG. 2, two component carriers each having a bandwidth of 10 MHz may be combined for a total bandwidth of 20 MHz. In a specific example, with carrier aggregation features enabled, the LTE-Advanced standard device supporting 20 MHz carrier aggregation may achieve downlink ("DL") throughput of 100 Mbps (when the maximum of five component carriers are aggregated). In another example, a theoretical maximum closer to 150 Mbps may be achieved such as with only two 10+10 carriers aggregated.

It should be noted that the network shown in the system 100 is only exemplary. For example, the number of eNBs 130-140 that may be in communicative range of the UE 105 may be more or fewer than three. Those skilled in the art will also understand that there may be any number of other types of networks that may also be in communicative range of the UE 105 and that the UE 105 may also be configured to establish connections therewith. For example, the system 100 may further include a legacy radio access network, a wireless local area network, a WiFi network, etc. If configured for such a capability, the CA functionality may even be used between other types of networks. However, for exemplary purposes, the CA functionality is described herein with regard to the LTE network and the component carriers being provided by the eNBs 130-140.

Figure 3:
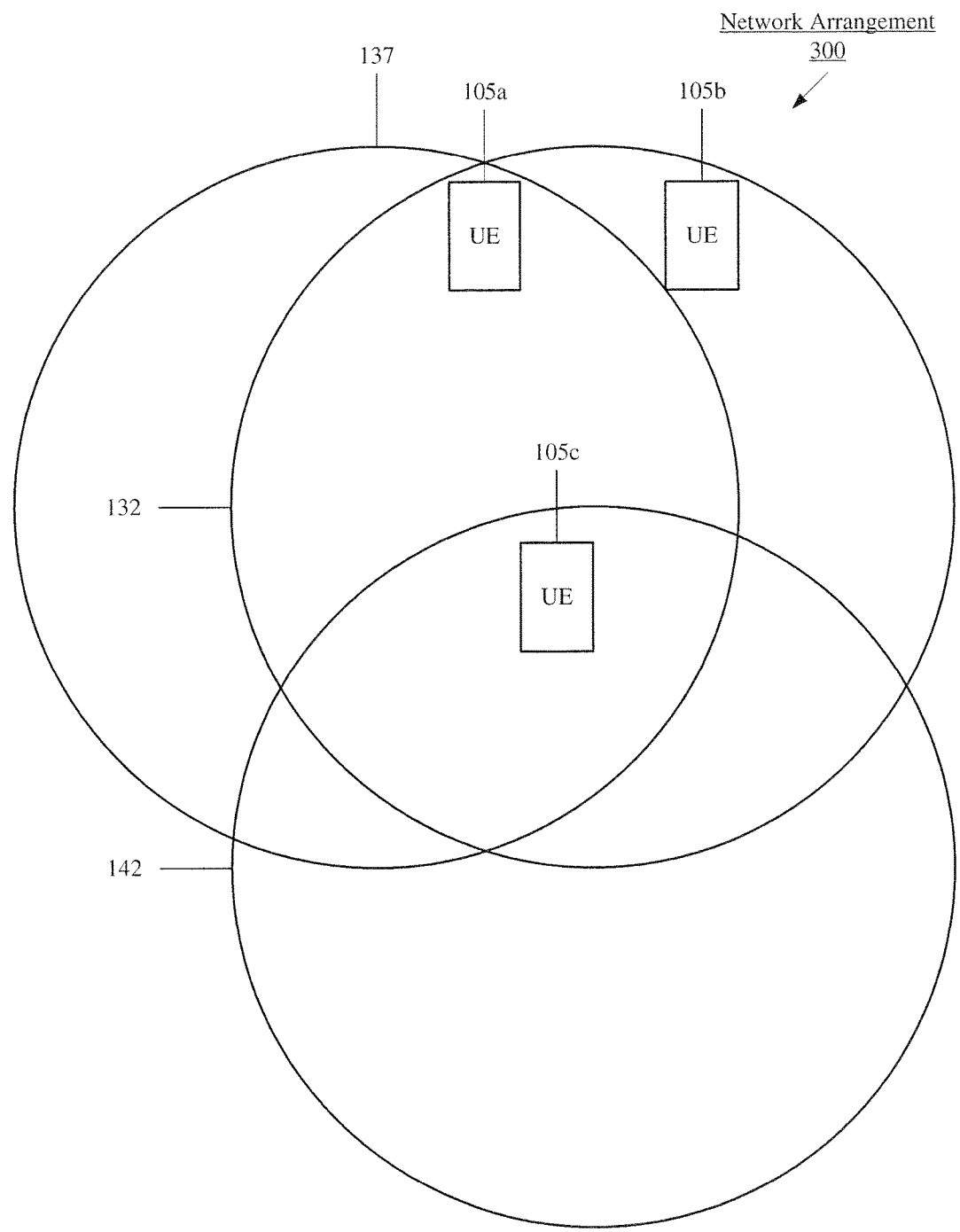
FIG. 3 shows an exemplary network arrangement where the user equipment may be located, according to some embodiments.

FIG. 3 shows an exemplary network arrangement 300 where the UE 105 may be located. Specifically, the network arrangement 300 may illustrate potential locations of the UE 105 within operating areas of the eNBs 130-140. As shown, the eNBs 130-140 may provide a portion of an overall operating area of the LTE network. Specifically, the eNB 130 may have an operating area 132, the eNB 135 may have an operating area 137, and the eNB 140 may have an operating area 142. The operating areas 132, 137, 142 may overlap such as shown in the network arrangement 300 of FIG. 3. Furthermore, it may be assumed that the tower or antenna associated with each eNB 130, 135, 140 is disposed near a center of the operating areas 132, 137, 142, respectively. It should be noted that the circular shape of the operating areas is only exemplary and that the eNBs 130, 135, 140 may have any configuration or disposition of the operating areas such as contiguous, separated, etc.

The network arrangement 300 also illustrates three potential positions of the UE 105. In a first example, the UE 105 may be in a position 105a that is included in operating areas 132, 137. In a second example, the UE may be in a position 105b that is included in operating area 132 only. In a third example, the UE may be in a position 105c that is included in operating areas 132, 137, and 142. The network arrangement 300 and the positions 105a-c illustrate a variety of different circumstances that may be experienced by the UE 105. It is noted that the positions 105a-c may be an initial position in which the CA throttling application 125 may process connection information or may be a position to which the UE 105 has moved. Thus, the CA throttling application 125 may determine when to implicitly deactivate a SCell from the connection information that may be present given one of the positions 105a-c.

In a first example, the UE 105 may be in position 105b. While in position 105b, the UE 105 may only be capable of communicating with the eNB 130 from its disposition within only the operating area 132. In such a scenario, the UE 105 may be incapable of using the CA functionality since the eNB 130 acts as the PCell providing the PCC only. That is, the other eNBs 135, 140 cannot be used as the SCell providing the SCC. While the UE 105 is in position 105b, the UE 105 may be near an edge of the eNB 130.

In a second example, the UE 105 may be in position 105a. While in position 105a, the UE 105 may be capable of communicating with the eNB 130 from its disposition within the operating area 132 and the eNB 135 from its disposition within the operating area 137. In such a scenario, the UE 105 may be capable of using the CA functionality in which the eNB 130 acts as the PCell providing the PCC due to its association with the UE 105. The eNB 135 may be the SCell providing the SCC. While the UE 105 is in position 105a, the UE 105 may be near an edge of both the eNBs 130, 135.

In a third example, the UE 105 may be in position 105c. While in position 105c, the UE 105 may be capable of communicating with the eNB 130 from its disposition within the operating area 132, the eNB 135 from its disposition within the operating area 137, and the eNB 140 from its disposition within the operating area 140. In such a scenario, the UE 105 may be capable of using the CA functionality in which the eNB 130 acts as the PCell providing the PCC due to its association with the UE 105. The eNB 135 may be a first SCell providing a first SCC while the eNB 140 may be a second SCell providing a second SCC. While the UE 105 is in position 105c, the UE 105 may be near an edge of the eNB 140 but within a more central location relative to the eNBs 130, 135.

According to the exemplary embodiments, the UE 105 may have the CA functionality enabled. For example, the UE 105 may be at position 105a such that the CA functionality includes the eNB 130 being the PCell while the eNB 135 is the SCell. Specifically, the eNB 130 may be communicatively linked with the neighboring eNBs 135, 140 and determine that the eNB 135 is available as a SCell. The UE 105 may utilize the CA functionality and benefit from an increased rate of transmission through the addition of the SCC provided by the SCell. However, the CA functionality also entails a higher power consumption. The CA throttling application 125 may determine when the UE 105 experiences this higher power consumption while not benefiting from the SCell. Specifically, with the eNB 130 controlling the CA functionality and the use of the SCells, the UE 105 may be forced to use the higher power consumption even when the SCell provides little to no benefit. That is, the activation and deactivation of the SCell is signaled by the eNB 130.

Those skilled in the art will understand that the SCell may be activated when the network or the eNB 130 (the PCell) determines that a downlink buffer associated with the UE 105 is full or beyond a threshold amount. That is, the UE 105 is to receive more data than the eNB 130 is configured to transmit. Accordingly, the UE 105 may require a further component carrier for this additional data. Because a UE 105 that is at an edge of an operating area has a higher likelihood of having a backlog of the downlink buffer associated with that UE 105, the UE 105 in this situation is often scheduled with a smaller modulation coding scheme (MCS). Therefore, the UE 105 at the edge of the operating area is also more likely to experience SCell activations. However, because the UE 105 is at the edge of the operating area, the UE is also prone to be in a location where the SCell may be OoS or provide degraded performance.

In the activated state of the CA functionality and with the eNB 130 determining that the CA functionality is to remain enabled, the network may implement different mechanisms to keep the CA functionality active. In a first example, the network may keep the SCell activated for the duration that the CA functionality remains active. This means the UE 105 must continuously monitor the SCC for activity and exchange the requisite signals with the SCell to keep the SCC active. Thus, the continuous activation of the SCell can result in a 100% increased power cost to the UE 105 from using the CA functionality. In a second example, the network may cycle the SCell between an activated and deactivated state. That is, the network may continuously cycle the SCell from being activated for an activated timer and then deactivated for a deactivation timer. The cycling activation of the SCell results in a 50% increased power cost from using the CA functionality. However, in either case, the power consumption is increased compared to when the CA functionality is deactivated. As described above, there may be instances where the UE 105 would prefer the lower power consumption of a CA deactivated state rather than the higher throughput of the CA activated state. However, the UE 105 does not control the activation/deactivation of the CA functionality, as it is a network function.

The CA throttling application 125 may determine a variety of conditions that trigger the implicit deactivation of the SCell. According to a first exemplary embodiment, the CA throttling application 125 may determine if the SCell is OoS. For example, the UE 105 may have moved from position 105a to position 105b. That is, the UE 105 is no longer in communicative range of the eNB 135. Those skilled in the art will understand that when the SCell cannot be reached, this may effectively result in the SCell being OoS from the viewpoint of the UE 105. With respect to the eNB 130, when no location information of the UE 105 and/or topographical information of the network operating areas is available, the eNB 130 may be unaware that the UE 105 has moved out of range of the eNB 135. Even when location information is available and/or information associated with the SCell being OoS is available (e.g., receiving a report including a CQI value of zero for the SCell from the UE), the eNB 130 may not be configured to deactivate the CA functionality. Accordingly, the eNB 130 may maintain the CA functionality in an activated state.

In another example, the issue may not be that the SCell is OoS but that the performance of the SCell is not commensurate with the power being used by the CA functionality (e.g., effective OoS). For example, the UE 105 may be in position 105a but the eNB 130 (the PCell) may operate on a first frequency band that is low while the eNB 135 (the SCell) may operate on a second frequency band that is high compared to the first frequency band. Those skilled in the art will understand that when the PCell and the SCell utilize frequency bands that are substantially separated from each other, this may prevent the CA functionality from being used as the PCC forms the basis upon which the CA functionality is to be configured. Again, the eNB 130 may be unaware of the frequency band usage of the eNB 135 that may result in an inoperable configuration of the CA functionality.

In a specific example, the CA throttling application 125 may determine when the SCell provided by the eNB 135 is effectively OoS through a calculated measurement of different connection parameters. For example, the calculated measurement may be a value associated with a signal-to-interference-plus-noise ratio (SINR) of the SCell. When the SCell has a SINR value below a threshold value, the CA throttling application 125 may determine that the SCell is effectively OoS. The threshold value associated with the SINR may be any value that is predetermined such as 0 dB to −5 dB. Those skilled in the art will understand that such a SINR value may be indicative that the SCell is still in communicative range but provides a very low throughput. In another example, the calculated measurement may be a value associated with a throughput ratio of the SCell and the PCell. When the SCell has a throughput ratio value below a threshold value, the CA throttling application 125 may determine that the SCell is effectively OoS. The threshold value associated with the throughput ratio may be any value that is predetermined such as 0.1 to 0.4. Those skilled in the art will also understand that such a throughput ratio value may be indicative that the SCell is, relative to the PCell, providing a very low throughput.

According to the exemplary embodiments, the UE 105 may utilize the CA throttling capability to implicitly deactivate the CA functionality for a SCell when that SCell has a degraded performance from being OoS or effectively OoS. That is, the CA functionality may be enabled in which the SCell is activated and both PCell and SCell resources are utilized at the cost of the higher power consumption. However, the degraded performance may relate to when the UE 105 is experiencing more degraded RF conditions for the SCell compared to a degraded but sustainable PCell. This may lead the UE 105 to a high power state where it is not able to derive proportional benefits (e.g., data rate) from the SCell. For example, the UE 105 may have moved from position 105c to position 105a. That is, the UE 105 may have moved from a central location of the operating areas 132, 137 to an edge location of these operating areas 132, 137. While in the central location, the UE 105 may experience good RF conditions such that the high power consumption of using the SCell is offset from the increased data rate. However, once moved to the edge location, the UE 105 may experience the poor RF conditions. In another example, the UE 105 may have moved from position 105c to position 105b. That is, the UE 105 may have moved from a central location of the operating areas 132, 137 to an edge location of operating area 132 and out of operating area 137. Once moved outside the operating area 137, the UE 105 may have no RF capability.

Figure 4:
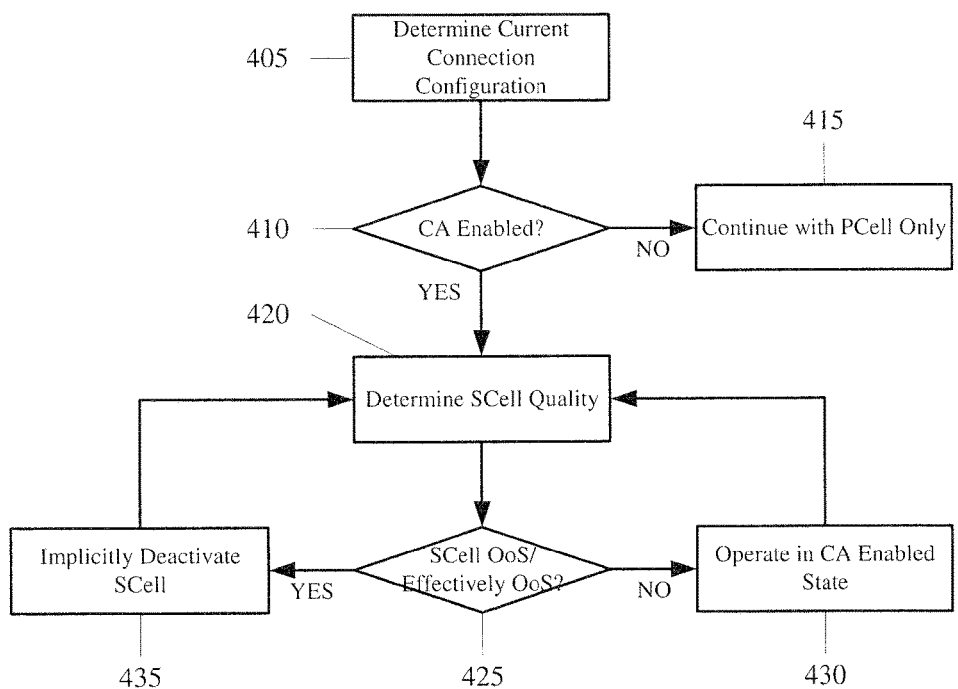
FIG. 4 shows an exemplary overall method for throttling a carrier aggregation functionality, according to some embodiments.

FIG. 4 shows an exemplary overall method 400 for throttling the CA functionality by implicitly deactivating the SCell. The overall method 400 may relate to a manner in which the UE 105 may either utilize the CA enabled state in which transmissions may be performed over the PCell and the SCell or utilize the implicitly deactivated CA state in which transmissions are performed over the PCell while monitoring of the SCell may be terminated for a time duration. As discussed above, the implicit deactivation of the SCell relates to a set of operations of the UE 105 to utilize a lower power consumption state despite the network still setting a CA enabled state for the UE 105. Thus, the UE 105 performs the method 400.

In 405, the CA throttling application 125 may determine a current configuration. Specifically, the CA throttling application 125 may determine whether the CA functionality is enabled by the network. For example, if the UE 105 is disposed at position 105*c* in a nearly central location of the operating area 132 of the eNB 130 with low downlink necessity (e.g., very little data bound for the UE 105), the CA functionality may not be required or preferred since the PCell may sufficiently handle all data transmissions in a timely manner. However, if the UE 105 is disposed at position 105*a* and has high downlink necessity, the CA functionality may be preferred. In 410, the CA throttling application 125 determines if the CA functionality is enabled. If disabled, the CA throttling application 125 continues the method 400 to 415 where only the PCell is used. If the CA functionality is enabled, the CA throttling application 125 continues the method 400 to 420. In 420, the CA throttling application 125 determines a quality of the SCell. Specifically, in 425, the CA throttling application 125 determines whether the SCell used in the CA enabled state is OoS or effectively OoS.

If the CA throttling application 125 determines that the SCell has been detected and provides appropriate throughput or operational parameters expected of its use given the high power consumption, the CA throttling application 125 continues the method 400 to 430. In 430, the UE 105 continues to operate in the CA enabled state to benefit from the improved performance of using the SCell at the cost of the higher power consumption. The CA throttling application 125 may return to 420 to continue monitoring the SCell quality. However, if the CA throttling application 125 determines that the SCell is OoS or effectively OoS, the CA throttling application 125 continues the method 400 to 435. In 435, the CA throttling application 125 implicitly deactivates the SCell. Again, the implicit deactivation of the SCell may include transmitting a CQI value of zero for the SCell to the network while terminating monitoring of the SCC provided by the SCell. The mechanisms used to determine whether the SCell is OoS or effectively OoS will be described in further detail below with regard to FIGS. 5 and 6. The CA throttling application 125 may return the method 400 to 420 to continue monitoring the SCell. For example, if at a subsequent time after implicitly deactivating the SCell, the CA throttling application 125 may determine that the SCell is not OoS or effectively OoS. The SCell may then be re-activated such that the CA enabled state may be used as indicated in 430.

Figure 5:
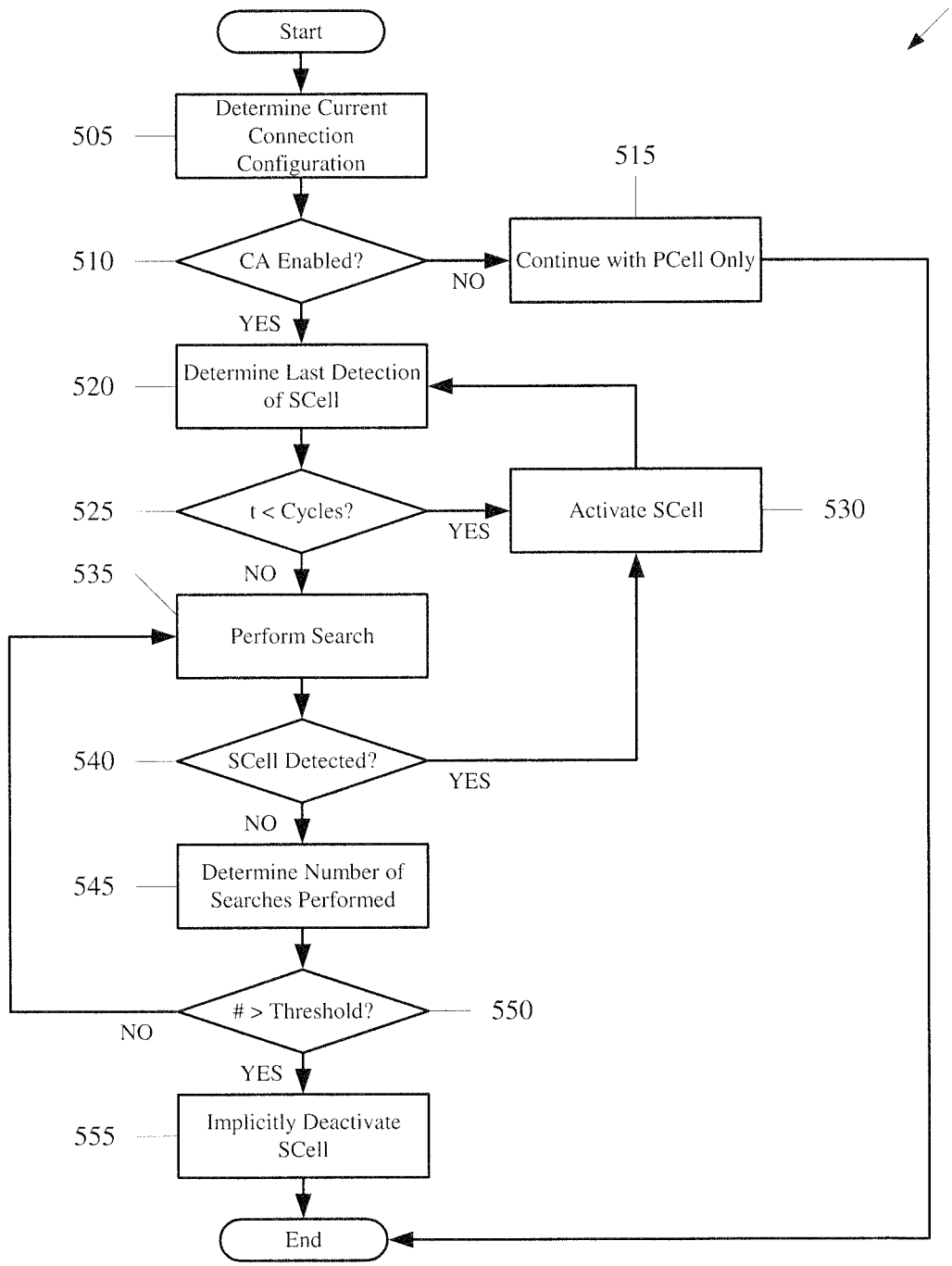
FIG. 5 shows a first exemplary method for throttling a carrier aggregation functionality, according to some embodiments.

FIG. 5 shows a first exemplary method 500 for throttling a CA functionality. Specifically, the method 500 relates to when the CA throttling application 125 implicitly deactivates a SCell that is determined to be OoS. Thus, the UE 105 performs the method 500. It may be assumed that the UE 105 is associated with the eNB 130 and that the eNB 130 is the PCell. The method 500 will be described with regard to the system 100 of FIG. 1 and the network arrangement 300 of FIG. 3.

In 505, the CA throttling application 125 may determine a current connection configuration in a substantially similar manner as 405 of the method 400. Thus, in 510, the CA throttling application 125 determines if the CA functionality is enabled. If disabled, the CA throttling application 125 continues the method 500 to 515 where only the PCell is used.

If the CA functionality is enabled, the CA throttling application 125 continues the method 500 to 520. In 520, the CA throttling application 125 determines a time when the SCell was last detected. The CA throttling application 125 may be configured to monitor the SCells provided by the different eNBs when the CA functionality is enabled. For exemplary purposes, it may be assumed that the eNB 135 is the SCell providing the SCC in the CA enabled UE 105. According to the exemplary embodiments, the CA throttling application 125 may initially determine whether the SCell has been detected within a predetermined time period. For example, the predetermined time period may be based upon a number of discontinuous reception (DRX) cycles that may be configured while connected to the LTE network. Thus, in 525, the CA throttling application 125 determines whether the last detection of the eNB 135 occurred less than a predetermined time such as one based upon a number of cycles of the DRX. When the CA throttling application 125 determines that the SCell has been detected within the predetermined time period, the CA throttling application 125 is aware that the SCell is in service. That is, the UE 105 may still be within communicative range of the eNB 135 such that the CA functionality is still viable for the UE 105.

It should be noted that the predetermined time period in which the SCell is to be detected may be selected based upon a variety of factors and may also be used in a variety of manners. As noted above, the predetermined timer may be selected based upon a number of DRX cycles. In another example, the predetermined timer may be selected based upon a user selected duration. In addition, the start of the predetermined time period may be determined in different manners. For example, the predetermined time period may be started at every five DRX cycles to determine whether the SCell is detected. In another example, the predetermined time period may be continuously monitored as an ongoing process.

If the SCell was detected within this time period, the CA throttling application 125 continues the method 500 to 530 where the SCell is activated (or continued to be activated). As discussed above, the manner in which the implicit deactivation is used may vary and the SCell may have already been implicitly deactivated such that the SCell may have been activated in 530. Once detected, an observed CQI value may be reported.

If the CA throttling application 125 determines that the SCell was not detected within the predetermined time period, the CA throttling application 125 continues the method 500 to 535 where a search functionality is performed to again attempt to detect the SCell. That is, the CA throttling application 125 may receive information that the SCell has not been detected within the predetermined time period. When the search functionality has started, the SCell may be detected using any known search feature. For example, the previously known frequency band used by the eNB 135 may be used as a basis to determine its presence on the UE 105.

It should be noted that if the CA throttling application 125 receives information that the SCell has not been detected within the predetermined time period, the CA throttling application 125 may perform the search functionality prior to a timer requiring a channel state information (CSI) report from being transmitted. In LTE networks, the CSI report is defined under the Third Generation Partnership Project (3GPP) specification (e.g., 36.133). For example, the timer to transmit the CSI report may be 34 ms. During this time, the CA throttling application 125 may perform the search functionality to detect the SCell or the eNB associated with the SCell.

In 540, the CA throttling application 125 may determine whether the SCell has been detected from the search functionality being used. If the SCell is detected, the CA throttling application 125 may continue the method 500 to 545. If the SCell has been found prior to the timer expiring, the SCell may be activated. That is, the UE 105 may continue to utilize the CA functionality since the SCell has been detected and assumed to provide the SCC.

Returning to 540, if the SCell is not detected, the CA throttling application 125 may continue the method 500 to 545. In 545, the CA throttling application 125 determines a number of searches performed. As discussed above, when the SCell is not detected, the UE 105 may transmit a CSI report within 34 ms. The search functionality may be performed with a given time duration such that a selected number of searches may be performed within the 34 ms. In 550, the CA throttling application 125 determines whether a number of searches that are performed is greater than a threshold where the threshold may correspond to the 34 ms time duration. If the search functionality has not reached the threshold, the CA throttling functionality 125 returns the method 500 to 535.

If the search functionality has been performed to an extent greater than the threshold, the CA throttling application 125 continues the method 500 to 555. In 555, the SCell is implicitly deactivated. As discussed above, the SCell may be implicitly deactivated by transmitting a CQI value of zero while using a lower power state in which the SCell is not used or monitored by the UE 105 (even though the LTE has the CA functionality enabled and using the SCell). Those skilled in the art will understand that the UE 105 may transmit a CQI value of zero to the eNB 130 that indicates that the SCell is out of range that is an allowed feature of the 3GPP 36.133 standard. The UE 105 may leverage this aspect by continuously reporting the CQI of zero for the SCell while it maintains an implicit deactivated state for the SCell. Therefore, the CQI value of zero may increase the probability that the network does not attempt to schedule any data transfer for the UE on the SCell. With respect to the UE 105, the UE 105 knows that it does not have to monitor the SCell for transmissions because it is reporting a CQI of zero for the SCell, thereby resulting in the lower power consumption state that mimics the SCell being deactivated even though the network is continuing as if the CA functionality is enabled. However, it should be noted that the SCell may even be autonomously or implicitly deactivated when no CQI value of zero is being reported.

It should be noted that the implicit deactivation may be performed at a variety of times. In a first example and as discussed above, the implicit deactivation may be performed upon the SCell not being detected upon the search functionality lapsing. That is, when the timer has expired and the CSI report is transmitted, the implicit deactivation may be performed by the CA throttling application 125. In a second example, the implicit deactivation may be performed once the SCell has not been detected for the predetermined time duration. That is, prior to the search functionality being performed, the CA throttling application 125 may implicitly deactivate the SCell by transmitting the CQI of zero to the network as well as using the lower power consumption functionality in which the SCell is not being used by the UE 105.

The CA throttling application 125 may perform subsequent s upon implicitly deactivating the SCell. For example, when the SCell has been implicitly deactivated, the UE 105 may initiate a timer to determine when to perform a subsequent search. So long as the SCell remains to not be found in these subsequent searches, the SCell may remain implicitly deactivated. However, if the CA throttling application 125 were to determine the presence of the SCell during a CA enabled state including the SCell, the CA throttling application 125 may reactivate the SCell and utilize the CA functionality.

As stated above, the CA throttling application 125 may determine a variety of conditions that trigger the implicit deactivation of the SCell. According to a second exemplary embodiment, the CA throttling application 125 may determine if the SCell has a degraded performance. That is, the CA throttling application 125 may determine when the CA functionality from using the SCell no longer warrants the higher power consumption state such as when the SCell is effectively OoS.

Figure 6:
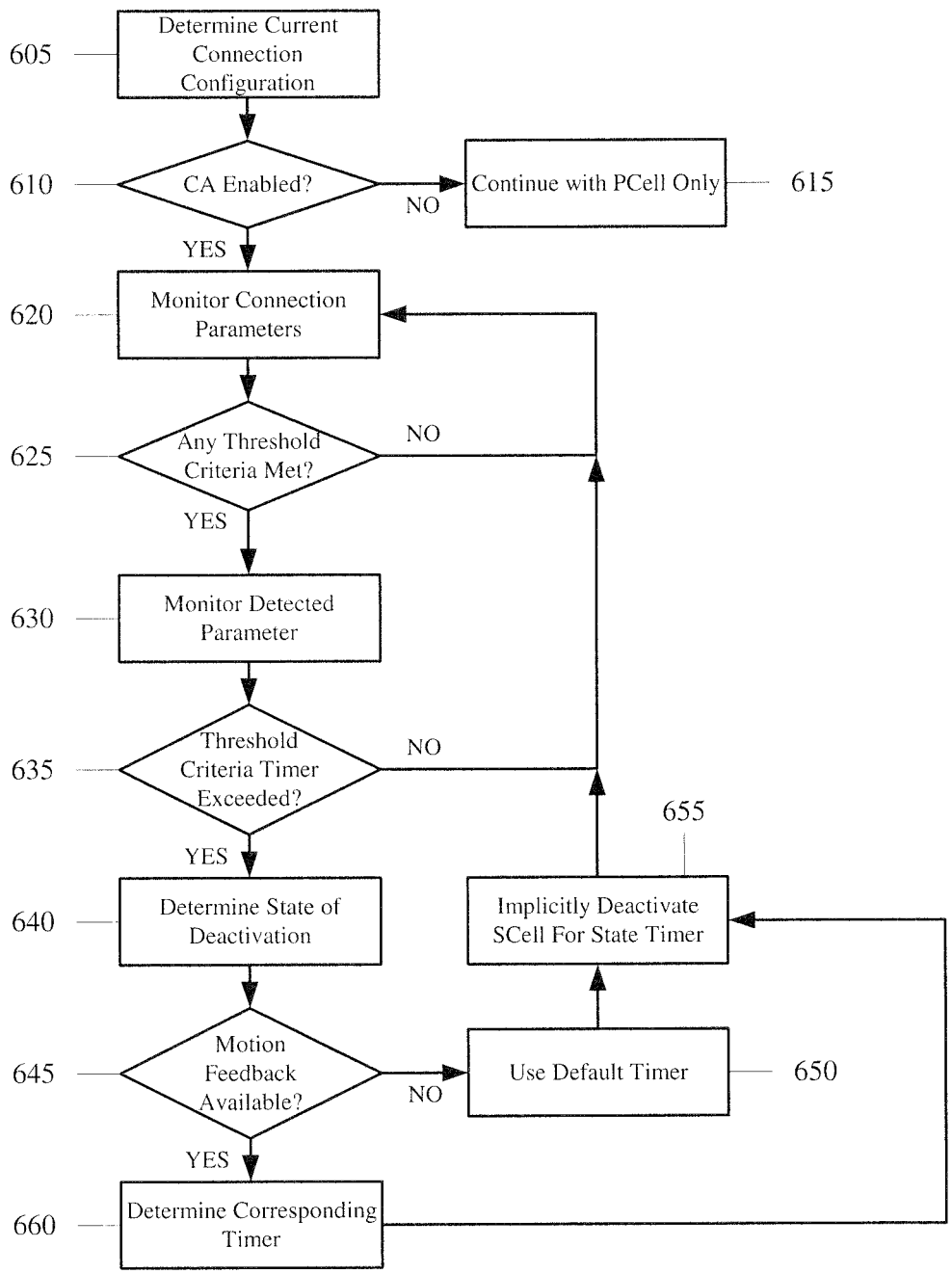
FIG. 6 shows a second exemplary method for throttling a carrier aggregation functionality, according to some embodiments.

FIG. 6 shows a second exemplary method 600 for throttling a CA functionality. Specifically, the method 600 relates to when the CA throttling application 125 implicitly deactivates a SCell whose gain for the CA functionality does not warrant the high power consumption (e.g., effectively OoS). Again, the UE 105 performs the method 600. It may be assumed that the UE 105 is associated with the eNB 130 and that the eNB 130 is the PCell. The method 500 will be described with regard to the system 100 of FIG. 1, the network arrangement 300 of FIG. 3, and the tables 700, 650 of FIGS. 7A, 7B.

In 605, the CA throttling application 125 may determine a current connection configuration. Specifically, the CA throttling application 125 may determine whether the CA functionality is enabled by the network. In 610, the CA throttling application 125 determines if the CA functionality is enabled. If disabled, the CA throttling application 125 continues the method 600 to 615 where only the PCell is used.

If the CA functionality is enabled, the CA throttling application 125 continues the method 600 to 620. In 620, the CA throttling application 125 monitors one or more connection parameters. According to the exemplary embodiments, the CA throttling application 125 may use one or more measurement thresholds associated with the connection parameters to indicate where gain from using the SCell is no longer considered optimal. The CA throttling application 125 may consider any measurement relating to a connection with the SCell. Although only exemplary, the CA throttling application 125 may consider one or more of a SCell downlink SINR, a SCell CQI, a SCell throughput, a SCell-PCell throughput ratio, a SCell downlink reference signal received power (RSRP), and a SCell downlink transport block (TB) size. The UE 105 may monitor these parameters using any known mechanism. It may again be used for exemplary purposes that the SCell is the eNB 135.

The CA throttling application 125 may include a further threshold criteria and combinations thereof. For example, the SCell-PCell throughput ratio may be a single parameter that when the value violates an acceptable range or predetermined threshold value, the CA throttling application 125 may determine that the threshold criteria has been met. In another example, the SCell downlink SINR and the SCell downlink TB size may be a combined criteria in which a violation of only one does not constitute the threshold criteria being met whereas a violation of both does constitute the threshold criteria being met. In this way, the CA throttling application 125 may analyze each of these connection parameters.

In 625, the CA throttling application 125 determines whether any threshold criteria have been met (e.g., violated an acceptable range). If the CA throttling application 125 determines that values of all connection parameters are within acceptable ranges, the CA throttling application 125 returns the method 600 to 620. However, if the CA throttling application 125 determines that at least one of the threshold criteria is met, the CA throttling application 125 continues the method 600 to 630. In 630, the detected connection parameter or combination (e.g., those connection parameters or combinations whose value exceeded the threshold in 625) continues to be monitored. For example, connection parameters that do not meet any threshold criteria may be omitted from monitoring while only the detected parameters are monitored. In another example, parameters that do not meet any threshold criteria may be monitored less frequently while the detected parameters are given higher priority for monitoring.

In contrast to when the SCell is OoS, the UE 105 may not be required to transmit a report such as the CSI within a selected time period when the SCell is effectively OoS. Accordingly, the UE 105 that is experiencing a degraded performance of the SCell may perpetually continue to have this low gain and high power consumption state. Therefore, according to the exemplary embodiments, the CA throttling application 125 may incorporate a timer in which the implicit deactivation is to be used where the detected connection parameter or combination is monitored.

According to the exemplary embodiments, the CA throttling application 125 may use a timer. For example, the timer may measure a time during which a value of a parameter is outside its acceptable range (e.g., the value exceeds its predetermined threshold). The CA throttling application 125 may determine when this measured time exceeds a timer value (e.g., between 200 ms and 1000 ms). When the measured time exceeds the timer value, this may be used as the basis in for the CA throttling application 125 to indicate that the implicit deactivation is to be used. For example, the UE 105 may momentarily experience a parameter value outside its acceptable range (e.g., the value of the parameter drops below the corresponding threshold value). However, subsequently, the value of the parameter may return to an acceptable range. This may occur before the timer reaches the timer value. Therefore, the CA throttling application 125 may determine that the value of the parameter remains in an acceptable state. However, should the value of the parameter remain outside the acceptable range for at least the timer value, the CA throttling application 125 may determine that the value of the parameter is not acceptable and may implicitly deactivate the SCell.

Therefore, in 635, the CA throttling application 125 determines whether the threshold criteria is met (e.g., parameter value out of acceptable range) for more than the timer value. If the threshold criteria is not met for more than the timer value, the CA throttling application 125 returns the method 600 to 620. Accordingly, an observed CQI value may be reported. However, if the threshold criteria is met for a time exceeding the timer value, the CA throttling application 125 continues the method 600 to 640. In 640, the CA throttling application 125 determines a state of deactivation.

According to the exemplary embodiments, the CA throttling application 125 may implicitly deactivate the SCell for different time durations based upon the timer value. FIG. 7A shows a first exemplary table 700 of time durations. Specifically, the table 700 may be a default table. The table 700 may include a plurality of states. The states may indicate a pass through of a number of times a determination has been made that the implicit deactivation is to take place. As illustrated, the timer value T may be used as the basis for each state. Accordingly, when the SCell is first determined to be implicitly deactivated, the CA throttling application 125 may reference the table 700 and determine that the implicit deactivation is to occur for a time T. The table 700 also indicates that when the SCell is determined to be implicitly deactivated for a second time, the SCell is implicitly deactivated for a time 2T. That is, the duration for which the implicit deactivation occurs may double. As the number of states increase, the CA throttling application 125 may again double the implicit deactivation time such at the third state has a time 4T and the fourth state has a time 8T. The table 700 may include further states (not shown) that identify the implicit deactivation time.

It should be noted that these values are only exemplary and any time duration may be used. It should also be noted that the continuous doubling of the time duration is only exemplary. For example, the increase in state may increase the time duration in a linear fashion so that the second state is 2T, the third state is 3T, the fourth state is 4T, etc. In another example, the increase of the time duration may hit a maximum such as 8T being a maximum implicit deactivation time duration so that at the fifth state, the implicit deactivation time is still 8T.

FIG. 7B shows a second exemplary table 750 of time durations. Specifically, the table 750 may be a table based upon further information. Specifically, movement information or a motion state may be used as another basis of the table 750. Those skilled in the art will understand that if the UE 105 is moving or stationary may alter RF conditions at a fast or slow manner. For example, when the UE 105 is stationary, it is likely that the RF conditions will not change substantially. In another example, when the UE 105 is moving at a fast speed, it is likely that the RF conditions may change due to a change in disposition of the UE 105.

The table 750 may also include a plurality of states. The states may again indicate a pass through of a number of times a determination has been made that the implicit deactivation is to take place. As illustrated, the timer value T may be used as the basis for each state. In the table 750, the motion state may also identify the time duration for implicit deactivation of the SCell. The table 750 may again utilize a doubling of the time duration for each ensuing state. By altering an initial value based upon the motion state, the time duration at each state may also be altered. For example, the stationary motion state may begin at a time duration 2T while the fast motion state may begin at a time duration T/2. In this way, the CA throttling application 125 may incorporate the motion state to determine the time duration for implicit deactivation is determined to do so.

It should be noted that if the CA throttling application 125 were to determine at a later time that the implicit deactivation is no longer required (e.g., the parameters rose above the threshold), the state may be reset. That is, the CA throttling application 125 may use the time duration at the first state if at an even later time the implicit deactivation were to be used. It should also be noted that the use of the timer value is only exemplary. For example, the exemplary embodiments may utilize predetermined time durations for each state. That is, an administrator may manually designate the time duration to be used in the tables. In another example, the exemplary embodiments may not utilize the timer value but may utilize any mathematical calculation to determine the duration for each state.

As discussed above, the tables 700, 750 may utilize a state that indicates a number of passthroughs that the SCell has been implicitly deactivated. Once identified, in 645, the CA throttling application 125 determines whether any motion feedback is available to identify the motion state. The motion feedback may be provided using any known manner such as inclusion of an accelerometer in the UE 105. If the motion feedback is not available, the CA throttling application 125 continues the method 600 to 650 where the default timer is used as indicated in the table 700. Thus, in 655, the CA throttling application 125 implicitly deactivates the SCell for the time duration indicated by the state in the table 700. However, if the motion feedback is available, the CA throttling application 125 continues the method 600 to 660 where the corresponding timer for the motion state is used as indicated in the table 750. Thus, in 655, the CA throttling application 125 implicitly deactivates the SCell for the time duration indicated by the state and motion state in the table 750.

In a specific example of using the above method 600, the UE 105 may monitor the above parameters and determine whether the gains from using the SCell are no longer worth the high power consumption. For example, if a value associated with the SCell downlink SINR drops below a predetermined threshold value, this may be indicative of a low gain from using the SCell. A substantially similar analysis may be performed for the remaining parameters. The CA throttling application 125 may analyze these parameters on an individual basis or may analyze these parameters in different combinations. For example, the SCell downlink SINR and the SCell-PCell throughput ratio may be analyzed together. Through the analysis of these parameters, the CA throttling application 125 may determine when the SCell is no longer considered to be in optimal conditions to warrant the higher power consumption. Accordingly, the CA throttling application 125 may implicitly deactivate the SCell. Using the above example of the UE 105 moving from the position 105c to position 105a, the UE 105 may reach the edge of the operating area 132 of the eNB 130 that may cause the SCell to be activated, particularly the one provided by the eNB 135. However, the SCell associated with the eNB 135 may no longer be in optimal conditions such as when the combination of a value associated with the SCell downlink SINR dropping below a corresponding predetermined threshold and a value associated with the SCell-PCell through ratio dropping below a corresponding predetermined threshold. The implicit deactivation of the SCell may use a substantially similar operation as described above in which the UE 105 transmits a CQI value of zero while deactivating the CA functionality associated with the SCell on its end.

It should further be noted that the use of the eNB 135 as the only SCell is only exemplary. As discussed above, the CA functionality may use one or more SCCs each provided by a SCell associated with an eNB. Thus, if the UE 105 is at position 105c within the operating areas 132, 137, 142 and the UE 105 has a relatively high data downlink inbound such that the SCC provided by the eNB 135 may still be insufficient, the UE 105 may have the CA functionality to further include the SCC provided by the eNB 140. However, such a configuration may require an even higher power consumption. The exemplary embodiments described above may be utilized in this scenario as well in an individual manner when analyzing the gain for the eNB 140 as well as in a combined manner to analyze both the gains for the eNB 135 and 140.

It should also be noted that the methods 400 and 500 may be integrated with other. For example, in the method 400, the CA throttling application 125 may continue processing after 430 by using the method 500. That is, the SCell may have been detected but may have a degraded performance. Thus, the analysis of the detected SCell may continue by analyzing the connection parameters. In another example, the analysis performed for the measurements in 445 may provide further insight as to whether the CA throttling application 125 is to use the method 500 for the detected SCell. In yet another example, the CA throttling application 125 may utilize the state determined in 540 of the method 500 to determine whether the SCell that is detected should be considered OoS due to continuous implicit deactivation. That is, when the state is determined to go beyond the listed states of the tables, the CA throttling application 125 may constructively determine that the SCell is CoS.

The exemplary embodiments provide a system and method of optimizing a CA functionality through throttling the SCell in question using an implicit deactivation thereof on a UE end. That is, the network side may still have the CA functionality enabled and include the SCell that has been implicitly deactivated by the UE. The UE may determine whether the SCell in question is OoS or has degraded performance. In either case, the gain from using the CA functionality may no longer be high enough to warrant the additional power usage associated therewith. Thus, through this analysis, the exemplary embodiments may conserve a limited power supply by only using the CA functionality when the improved data rate may be realized in a measurable degree.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A user equipment, comprising:
   a transceiver configured to enable the user equipment to establish a connection with a network including a first network component and a second network component and to use a carrier aggregation functionality, the first network component configured as a primary serving cell (PCell) and the second network component configured as a secondary serving cell (SCell); and
   a processor configured to implicitly deactivate the SCell while the carrier aggregation functionality is enabled by the network by:
   determining that the carrier aggregation functionality is enabled by the network;

determining that the SCell is one of out-of-service (OoS) and effectively OoS, the SCell being effectively OoS when the second network component is reachable by the user equipment and a connection parameter with the second network component is below a predetermined threshold;

transmitting a channel quality indicator (CQI) value of zero for the SCell to the first network component to implicitly deactivate the SCell; and prior to the network deactivating the SCell, utilizing a low power consumption state where monitoring of the SCell is terminated.

2. The user equipment of claim 1, wherein the processor determines that the SCell is OoS by:

determining an absence of the SCell for a predetermined time duration.

3. The user equipment of claim 2, wherein the processor is further configured to implicitly deactivate the SCell by:

performing a search for the SCell upon determining the absence of the SCell.

4. The user equipment of claim 3, wherein the network is a Long Term Evolution (LTE) network configured with a Discontinuous Reception (DRX) functionality, and wherein the predetermined time duration is based upon a predetermined number of cycles of the DRX functionality.

5. The user equipment of claim 3, wherein the processor is further configured to implicitly deactivate the SCell by:

initiating a timer upon determining the absence of the SCell; and transmitting a channel state information (CSI) report to the first network component upon expiry of the timer.

6. The user equipment of claim 5, wherein the processor is further configured to implicitly deactivate the SCell by:

performing at least one further search for the SCell while the timer is running.

7. The user equipment of claim 3, wherein, when the search detects a presence of the SCell, the user equipment transmits an observed CQI value for the SCell and utilizes a high power consumption state where the SCell is monitored.

8. The user equipment of claim 2, wherein the CQI value of zero is transmitted upon determining the absence of the SCell.

9. The user equipment of claim 1, wherein the connection parameter includes at least one measured connection value between the user equipment, the first network component, the second network component, and a combination thereof.

10. The user equipment of claim 9, wherein the at least one measured connection value is associated with one of a SCell downlink signal-to-interference-plus-noise (SINR), a SCell channel quality indicator (CQI), a SCell throughput, a SCell-PCell throughput ratio, a SCell downlink reference signal received power (RSRP), and a SCell downlink transport block (TB) size.

11. The user equipment of claim 9, wherein the processor determines that the SCell is effectively OoS by:

monitoring the connection parameter associated with the SCell; and determining whether a criteria threshold for the connection parameter is met.

12. The user equipment of claim 11, wherein the criteria threshold is when a drop occurs below a predetermined threshold value.

13. The user equipment of claim 11, wherein the processor determines that the SCell is effectively OoS by:

initiating a timer upon the criteria threshold being met; and monitoring that the connection parameter satisfies the criteria threshold until the timer expires.

14. The user equipment of claim 10, wherein the CQI value of zero is transmitted for a predetermined time duration.

15. The user equipment of claim 14, wherein the predetermined time duration increases based upon a state of implicit deactivation, the state defined by a consecutive instance the SCell is implicitly deactivated.

16. The user equipment of claim 15, wherein the processor determines that the SCell is effectively OoS by:

determining motion state information of the user equipment, the predetermined time duration being based upon the motion state information.

17. The user equipment of claim 15, wherein the predetermined time duration doubles for each subsequent state.

18. The user equipment of claim 14, wherein the processor monitors the connection parameter associated with the SCell after the predetermined time duration and determines a criteria threshold for the connection parameter is not met, and wherein the user equipment transmits an observed CQI value for the SCell and utilizes a high power consumption state where the SCell is monitored.

19. The user equipment of claim 10, wherein the measured connection value is a SCell-PCell throughput ratio value and the predetermined threshold is between 0.1 and 0.4.

20. The user equipment of claim 10, wherein the measured connection value is a combination of a SCell downlink SINR value and a SCell downlink TB size value and the predetermined threshold for the SCell downlink SINR is between 0 dB and −5 dB.

21. A method, comprising:

at a user equipment configured to implicitly deactivate a secondary serving cell (SCell) while a carrier aggregation functionality is enabled by a network, the user equipment establishing a connection with a network including a first network component configured as a primary serving cell (PCell) and a second network component configured as the SCell;

determining that the carrier aggregation functionality is enabled by the network;

determining an absence of the SCell for a predetermined time duration;

performing a search for the SCell upon determining the absence of the SCell;

transmitting a channel quality indicator (CQI) value of zero for the SCell to the first network component while performing the search to implicitly deactivate the SCell; and prior to the network deactivating the SCell, utilizing a low power consumption state where monitoring of the SCell is terminated.

22. A method, comprising:

at a user equipment configured to implicitly deactivate a secondary serving cell (SCell) while a carrier aggregation functionality is enabled by a network, the user equipment establishing a connection with a network including a first network component configured as a primary serving cell (PCell) and a second network component configured as the SCell;

determining that the carrier aggregation functionality is enabled by the network;

monitoring at least one connection parameter associated with the SCell;

determining whether a criteria threshold for the at least one connection parameter is met;

transmitting a channel quality indicator (CQI) value of zero for the SCell to the first network component when the criteria threshold is met for a predetermined time duration; and prior to the network deactivating the SCell, utilizing a low power consumption state where monitoring of the SCell is deactivated for the predetermined time duration.

\* \* \* \* \*